UNITED STATES PATENT OFFICE.

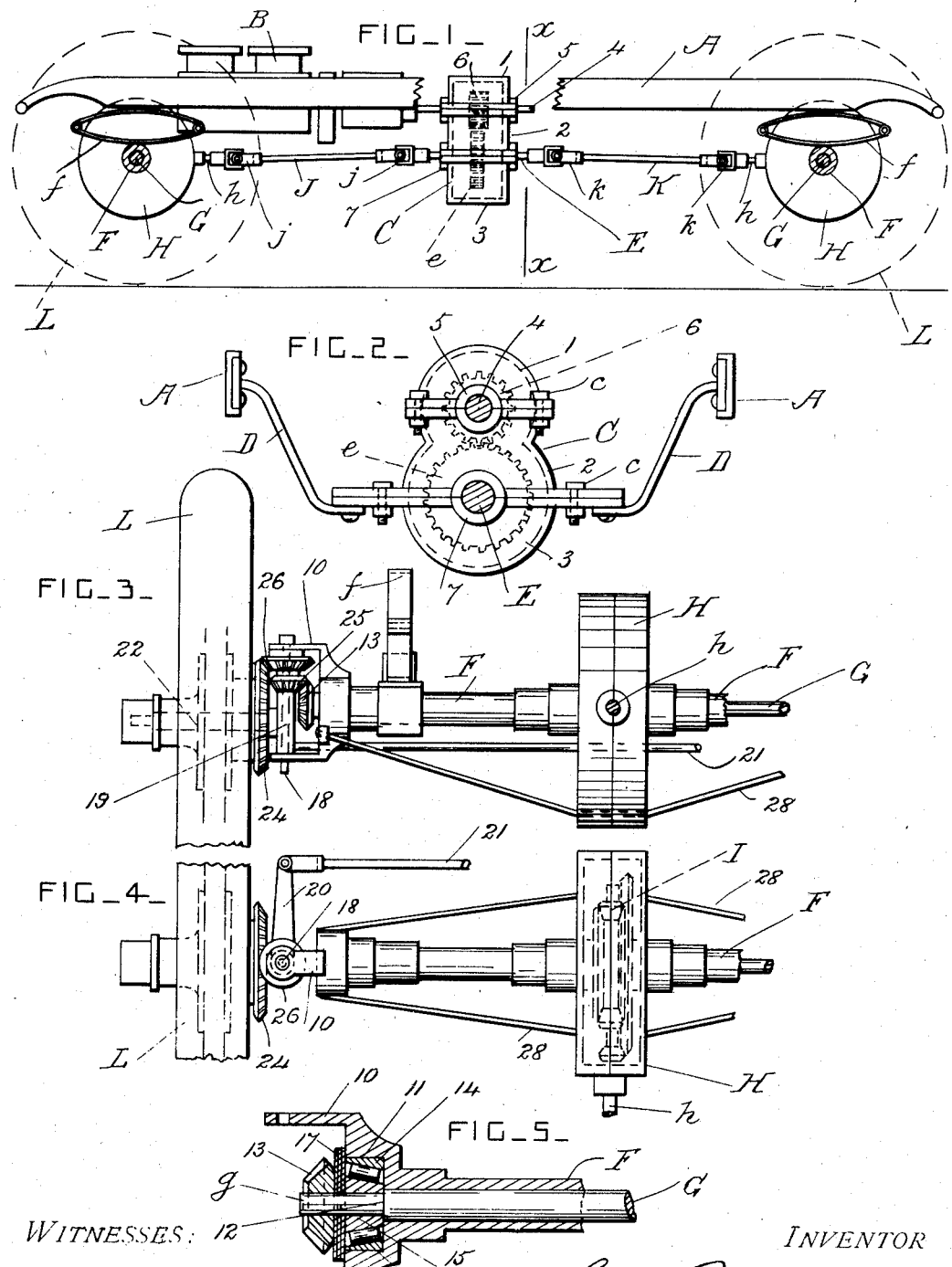

ERNST ROSENBERGER, OF MANKATO, MINNESOTA.

MOTOR-VEHICLE.

No. 905,462.   Specification of Letters Patent.   Patented Dec. 1, 1908.

Application filed January 7, 1908. Serial No. 409,803.

*To all whom it may concern:*

Be it known that I, ERNST ROSENBERGER, a citizen of the United States, residing at Mankato, in the county of Blue Earth and State of Minnesota, have invented certain new and useful Improvements in Motor-Vehicles; and I do hereby declare the following to be a full, clear, and exact description of the invention, such as will enable others skilled in the art to which it appertains to make and use the same.

This invention relates to the driving gear of motor vehicles; and it consists in the novel construction and combination of the parts hereinafter fully described and claimed.

In the drawings, Figure 1 is a side view of portions of a motor vehicle showing portions of the machine in section. Fig. 2 is a cross-section taken on the line $x$—$x$ in Fig.
1. Fig. 3 is a front view of the steering gear at one end portion of one of the axles. Fig. 4 is a plan view of the same. Fig. 5 is a longitudinal section through the end portion of one of the axles.

A are the side-bars of the frame of the vehicle which is of any approved construction, and B is any approved motor secured between the said side-bars.

C is a gear casing formed of three superposed sections 1, 2 and 3, provided with flanges and secured together by bolts $c$.

D are curved brackets of resilient material secured to the side-bars A and to the lower section 3 of the said casing.

The motor is operatively connected with a driving-shaft 4 which is journaled in bearings 5 formed at the ends of the casing sections 1 and 2. A toothed driving pinion 6 is secured on the shaft 4 inside the casing.

E is a countershaft journaled in bearings 7 on the ends of the casing sections 2 and 3, and $e$ is a toothed wheel secured on the middle part of the shaft E and gearing into the pinion 6. The casing is used as a support for these wheels, and as a dust-proof oil-chamber so that they may be constantly lubricated and run without perceptible noise.

F are similar axles at the front and rear of the machine. These axles are tubular, and they are supported from the frame of the vehicle by springs $f$. Each tubular axle has a similar driving-shaft G journaled in it. At the middle part of each axle a casing H is secured, and $h$ is a longitudinal driving-shaft which projects from this casing. A compensating-gear I of any approved construction is inclosed in each casing H, and this gear operatively connects the shaft $h$ with the cross shaft G, which is formed in two sections in the usual manner.

J and K are two similar longitudinal driving-shafts provided at their ends with universal couplings $j$ and $k$ respectively of any approved construction. These longitudinal shafts and universal couplings connect the ends of the countershaft E with the two longitudinal shafts $h$ of the compensating-gears I, so that the front and rear cross driving shafts are driven simultaneously.

The spring brackets D permit the gear-casing to oscillate to a limited extent, and more particularly in a direction longitudinal of the frame, so that the universal couplings are not broken when the vehicle is traveling over a rough road and the springs $f$ are yielding.

The steering mechanisms at each road wheel are all alike, and the description will therefore be confined to one of them.

A forked bracket 10 is secured on the end portion of the tubular axle F, and 11 is a circular chamber formed in the said bracket concentric with the axle. The cross shaft G has an end portion $g$ of smaller diameter than its main portion and which forms a shoulder 12. A small beveled toothed wheel 13 is secured on the end portion $g$. A conical roller race 14 is secured in the chamber 11. A conical bush 15 is secured on the end portion $g$ of the shaft against the shoulder 12, and 16 are anti-friction rollers which run between the said race and bush. Washers 17 are secured between the bush 15 and the wheel 13, and one of these washers closes the space between the race and bush so that the rollers cannot slip out, and so that dust is excluded from access to them.

The rollers 16 have their axes inclined towards the main part of the shaft G at the middle of the axle, so that they receive the end thrust as well as the vertical pressure.

A pin 18 is arranged vertically in the said forked bracket, and 19 is a sleeve which is pivoted on the lower part of the said pin. This sleeve 19 is provided with a projecting arm 20 for the attachment of a steering-rod 21. A bearing-spindle 22 also projects from the sleeve 19, and is arranged below the axis of the shaft G.

A road-wheel L of any approved construction is journaled on the spindle 22, and 24 is a beveled toothed wheel secured to the hub of the said road-wheel. A small beveled toothed wheel 25 and a large beveled toothed pinion 26 are secured together and are journaled on the upper end portion of the pin 18, above the pivoted sleeve 19. The small wheel 25 is arranged in gear with the small wheel 13, and the pinion 26 is arranged in gear with the beveled toothed wheel 24 on the road-wheel.

The washers 17 permit the adjustment of the two small beveled toothed wheels, and the roller-bearing receives the thrust of the wheel 13 and enables the parts to run very smoothly. The shaft G is arranged a little above the axis of the road-wheel spindle, so that a liberal space is provided between the casing of the compensating-gear and the ground.

Braces 28 are provided below the axle between the casing of the compensating-gear and the forked bracket, to strengthen these parts and to prevent the middle portion of the axle from sagging.

What I claim is:

In a motor vehicle, the combination, with a frame, road-wheels journaled at each end of the said frame, and driving-devices f )r the said road-wheels provided with longitudinal shafts $h$; of a motor carried by the said frame and provided with a motor-shaft, a gear-casing having one end portion of the said motor-shaft journaled in it, spring-arms supporting the said gear-casing from the said frame independent of the said motor, a countershaft journaled in the said gear-casing, toothed wheels inclosed in the said casing and connecting the said motor-shaft and countershaft, longitudinal shafts J and K, and universal couplings connecting the ends of the shafts J and K with the ends of the countershaft and with the longitudinal shafts $h$.

In testimony whereof I have affixed my signature in the presence of two witnesses.

ERNST ROSENBERGER.

Witnesses:
   ERNEST R. BROWN,
   S. V. WALRATH.